United States Patent
Nagase et al.

[11] Patent Number: 6,034,500
[45] Date of Patent: Mar. 7, 2000

[54] STEPPING MOTOR CONTROL APPARATUS

[75] Inventors: Mitsuru Nagase, Hitachinaka; Asahiko Otani, Mito; Tomoharu Sasaki, Hitachinaka, all of Japan

[73] Assignees: Hitachi, Ltd.; Hitachi Car Engineering Co., Ltd., both of Japan

[21] Appl. No.: 09/294,313

[22] Filed: Apr. 20, 1999

[30] Foreign Application Priority Data

Apr. 24, 1998 [JP] Japan .................................. 10-114712

[51] Int. Cl.[7] .............................. F02D 45/00; G02P 8/00; G05B 19/40
[52] U.S. Cl. ......................... 318/685; 318/696; 123/339; 123/361; 123/399
[58] Field of Search ..................... 318/685, 696, 318/430–469, 490; 361/20–35; 368/76, 218, 202, 157, 160; 123/339, 361, 340, 399, 352, 698, 333, 520, 350; 364/431.02; 477/110, 97

[56] References Cited

U.S. PATENT DOCUMENTS

| | | | |
|---|---|---|---|
| 3,896,363 | 7/1975 | Kinsel et al. | 318/685 |
| 4,283,783 | 8/1981 | Nakajima et al. | 368/76 |
| 4,462,360 | 7/1984 | Kobayashi et al. | 123/339 |
| 4,533,257 | 8/1985 | Kitano et al. | 368/202 |
| 4,612,616 | 9/1986 | Binns et al. | 364/431.02 |
| 4,854,283 | 8/1989 | Kiyono et al. | 123/361 |
| 4,882,530 | 11/1989 | Kabune et al. | 318/696 |
| 4,953,652 | 9/1990 | Ohmura et al. | 180/140 |
| 5,383,679 | 1/1995 | Nakamura et al. | 280/707 |
| 5,391,127 | 2/1995 | Nishimura | 477/110 |
| 5,524,724 | 6/1996 | Nishigaki et al. | 180/176 |
| 5,640,943 | 6/1997 | Tasaka et al. | 123/399 |
| 5,685,285 | 11/1997 | Ohtani et al. | 123/698 |

FOREIGN PATENT DOCUMENTS 63-95895   4/1988   Japan .

*Primary Examiner*—Paul Ip
*Attorney, Agent, or Firm*—Evenson McKeown Edwards & Lenahan P.L.L.C.

[57] ABSTRACT

A stepping motor control apparatus for controlling a stepping motor to drive a fluid flow control valve in an engine includes an operation state monitoring unit for monitoring the operation state of the engine; a step position monitoring unit for monitoring a step position of the stepping motor; a first motor drive direction-determining unit for determining the motor drive direction during normal operations of the stepping motor as determined by a target step position and the present step position of the stepping motor; a second motor drive direction-determining unit for determining the motor drive direction during anomalous operations of the stepping motor; a drive pulse-rate determining unit for determining the pulse generation rate to drive the stepping motor; and a drive unit for driving the stepping motor at the pulse generation rate determined by the drive pulse-rate determining unit.

11 Claims, 7 Drawing Sheets

BYPASS-AIR FLOW

| PATTERN NO. | A PHASE | B̄ PHASE | Ā PHASE | B PHASE |
|---|---|---|---|---|
| 0 | 1 | 0 | 0 | 1 |
| 1 | 0 | 0 | 0 | 1 |
| 2 | 0 | 0 | 1 | 1 |
| 3 | 0 | 0 | 1 | 0 |
| 4 | 0 | 1 | 1 | 0 |
| 5 | 0 | 1 | 0 | 0 |
| 6 | 1 | 1 | 0 | 0 |
| 7 | 1 | 0 | 0 | 0 |

1: ON
0: OFF

STEPPING MOTOR CONTROL APPARATUS

BACKGROUND OF THE INVENTION

The present invention relates to a stepping motor control apparatus, and especially to a stepping motor control apparatus for driving a control valve in an engine, such as an idling-speed control valve provided in a bypass path connecting the upper and down streams of a throttle valve.

Currently, fluid flow control valves such as a throttle valve, an idling-speed control valve provided in a throttle-bypass path, an exhaust-gas feedback control valve, etc. are provided at various positions in an engine, and the opening/closing of each fluid flow control valve is driven by a stepping motor controlled by an engine control unit. If the stepping motor that drives the fluid flow control valve malfunctions, this malfunction negatively effects the control of the engine.

For example, a problem called the lost-step state occasionally occurs when operating the stepping motor. In a typical stepping motor, since a sensor to detect the step position of the motor is not provided, the motor-angle control (step control) for the stepping motor is performed by a control signal sent from an engine control unit using an open-loop control method in which the motor-step number to be changed is obtained by calculating the difference between the target step position and the previous step position.

However, in the above open-loop control method, sometimes the required motor-step number is not changed due to a malfunction such as the sticking of the stepping motor. This results in the lost-step state, in which the actual step position differs from the step position that the motor should attain. Thus, since the correct step position cannot be attained in the event of the lost-step state, it has become very important to detect or prevent the lost-step state. In Japanese Patent Application Laid-Open Sho. 63-95895, there is a technique in which if a demand signal for moving the motor to the maximum or minimum position continues for a predetermined period, the actual step position coincides with the obtained and stored step position by moving the motor to the maximum or minimum position.

When the stepping motor or the fluid valve is jammed by a foreign substance which has gotten near the stepping motor rotor or a fluid flow control valve plug, or the rotor or the valve plug is directly stuck by viscous material which has entered the motor or the valve, or by the viscous material freezing, recovery from the lost-step state is difficult until the rotor can begin to rotate, even if the step position is corrected. In the above state, even if driving the motor with the usual high pulse-rate is attempted, due to the time required for current to flow in the motor, it is difficult to flow a sufficient amount of current in the motor. Accordingly, the motor cannot generate a large torque, which makes recovery from the lost-step state very difficult.

If the sticking or freezing occurs in an idling-speed control valve (ISC/V) driven by a stepping motor, since the actual step position of the stepping motor does not change, it results in the lost-step state. When an engine is warmed up, the rotational speed of the engine is gradually increased and exceeds the target rotational speed. If a rotational speed-feedback control operation is performed, the control value of the rotational speed is reduced to the minimum, and the stepping motor can no longer be controlled. Also, although the actual step position does not change, the estimated step position approaches and finally reaches the target step position. At that time, control achieved, and the stepping motor no longer moves. Even if the motor and the valve are released from a stuck or frozen state, the stepping motor is not moved to the target step position. Accordingly, a high-idle state or an unstable idling state continues.

SUMMARY OF THE INVENTION

The present invention has been achieved in consideration of the above described problems, and is aimed at providing a stepping motor control apparatus capable of suppressing the control degradation of a stepping motor by detecting anomalous operations of the stepping motor early and quickly restoring a normal control state from an unstable engine control state, if a lost-step state occurs in the stepping motor that drives a control valve in the engine such as an idling-speed control valve.

To attain the above object, the present invention provides a stepping motor control apparatus for controlling a stepping motor to drive a fluid flow control valve in an engine.

The stepping motor control apparatus includes an operation state-monitoring means for monitoring the operation state of the engine. A drive means is provided for determining a driving method of the stepping motor and driving the stepping motor based on output signals from the operation state-monitoring means. If an anomalous operation of the stepping motor is detected by the operation state-monitoring means, the drive means switches the torque-control mode of the stepping motor from a normal-state control mode to an anomalous-state control mode.

Further, in the above stepping motor control apparatus according to the claim 5, the drive means controls the stepping motor so as to increase the torque of the stepping motor.

According to another embodiment of the present invention, a stepping motor control apparatus for controlling a stepping motor to drive a fluid flow control valve in an engine, including an operation state-monitoring means for monitoring the operation state of the engine. A step position monitoring means for monitoring a step position of the stepping motor is also provided. Also provided are a first motor drive direction-determining means for determining the motor drive direction during normal operations of the stepping motor, based on a target step position and the present step position of the stepping motor; a second motor drive direction-determining means for determining a motor drive direction during anomalous operations of the stepping motor; a drive-pulse rate-determining means for determining a pulse generation rate for driving the stepping motor; and a drive means for driving the stepping motor at the pulse generation rate determined by the drive-pulse rate-determining means.

Furthermore, in the above stepping motor control apparatus, the step position monitoring means determines that the present step position is anomalous if the present step position is equal to the target step position, and the difference between the present rotational speed and the target rotational speed of the engine exceeds a predetermined reference value.

Additionally, in the above stepping motor control apparatus, if it is determined that the present step position is anomalous, the drive-pulse generation rate-determining means sends the motor drive control means a demand signal to drive the stepping motor at a predetermined pulse-rate until the difference is decreased to a level lower than the predetermined reference value.

Also, in the above stepping motor control apparatus, the predetermined pulse-rate has a pulse-rate frequency such that it will increase output torque of the stepping motor.

Further, in the above stepping motor control apparatus, the predetermined pulse-rate has a pulse-rate frequency less than that at which the stepping motor has been driven in normal operations of the motor.

Further still, in the above stepping motor control apparatus, the drive direction-determining means for normal or anomalous operations sends the motor drive control means a command signal to drive the stepping motor to open the fluid flow control valve if the present rotational speed is lower than the target rotational speed of the engine.

Moreover, in the above stepping motor control apparatus, the drive direction-determining means for normal or anomalous operations sends the motor drive control means a command signal to drive the stepping motor to close the fluid flow control valve if the present rotational speed is higher than the target rotational speed of the engine.

The above stepping motor control apparatus further includes learning means for learning a correct step position, in which the execution of the learning means is stopped while a demand signal to drive the stepping motor is output from the second motor drive direction-determining means.

Furthermore, in the above stepping motor control apparatus if the present step position and the target step position are changed and renewed to step positions predetermined for anomalous operations, the learning means clears the step position which had been learned or changes the learned step position to the renewed step position.

In accordance with the above stepping motor control apparatus, even if the sticking or freezing occurs in the stepping motor, the control degradation due to the lost-step state can be suppressed by quickly recovering a normal control state from a high-idle state or an unstable engine control state.

DETAILED DESCRIPTION OF THE EMBODIMENTS

Hereafter, details of the embodiments of the stepping motor control apparatus according to the present invention will be explained with reference to the drawings.

Figure 1:
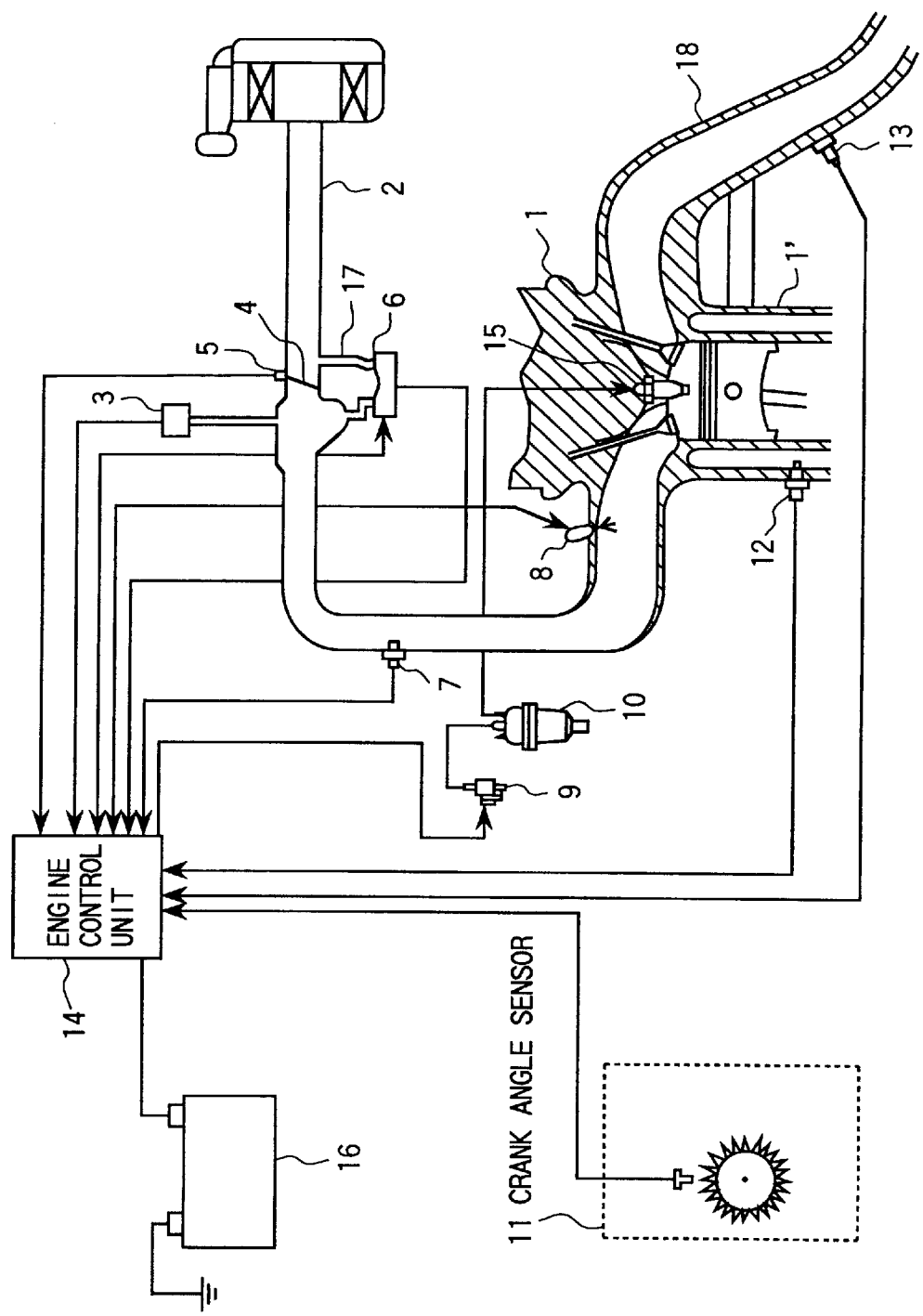
FIG. 1 shows the whole composition of an engine system with a stepping motor control apparatus of an embodiment according to the present invention.

FIG. 1 shows the whole composition of an engine system with a stepping motor control apparatus of an embodiment according to the present invention. In this figure, an air intake path 2 (air intake tube) and an exhaust path 18 (exhaust tube) are connected to a cylinder 1' of an engine. The air intake path 2 includes a throttle valve 4 to adjust the flow rate of intake air fed into the cylinder 1' of the engine 1, a throttle sensor 5 to detect the degree of opening for the throttle valve 4, a pressure sensor 3 to detect the pressure in the air intake tube at the lower stream of the throttle valve 4, a stepping motor-driven idling speed control valve (ISC/V) 6 to adjust the open area of a bypass path 17 for communicating with the upper and the lower stream, and an intake air temperature sensor 7 and an injection valve 8 to feed fuel into the engine 1.

Moreover, the engine 1 includes a crank angle sensor 11 to detect the crank angle, a water temperature sensor 12 to detect engine cooling water temperature, an igniter and ignition coil 9 to generate high voltage, a distributor 10 to distribute the generated high voltage to each cylinder 1', and an ignition plug 15. Also, an oxygen sensor 13 to detect the concentration of oxygen in the exhaust gas is provided in the exhaust path 18.

Furthermore, an engine control unit 14 (ECU) to control the engine 1 is connected to the engine 1, and state-variable signals detected by the various sensors are input to the engine control unit 14, which outputs a control signal to the stepping motor control apparatus. Further, power is fed to the engine control unit from a battery 16.

Figure 2:
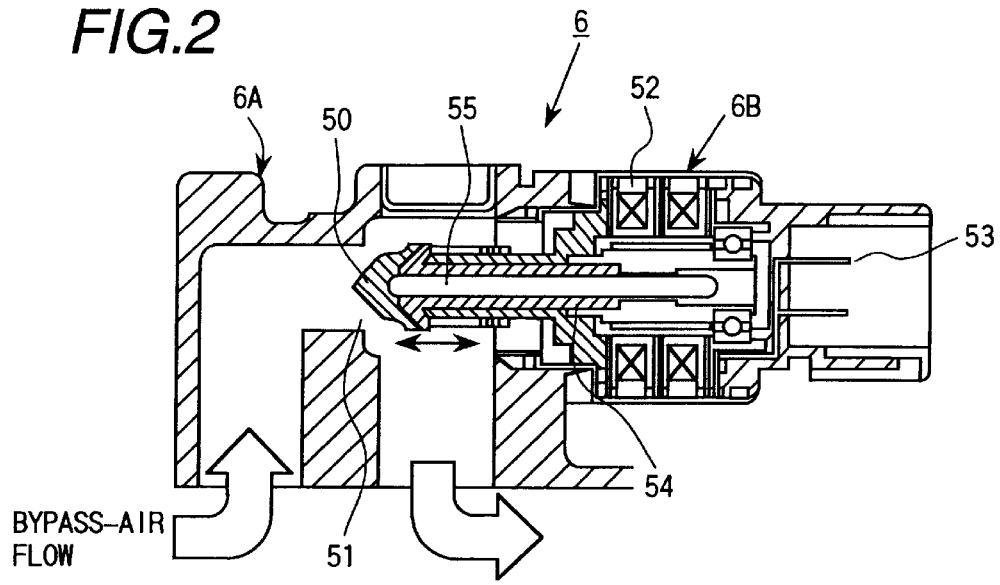
FIG. 2 is a cross sectional view of an idling-speed control valve driven by the stepping motor shown in FIG. 1.

FIG. 2 is a cross sectional view of the idling-speed control valve driven by the stepping motor (the stepping motor-driven idling-speed control valve 6). This stepping motor-driven idling-speed control valve 6 provided in the bypass path 17 and is composed of a valve body 6A and a stepping 6B. The intake air flow rate is adjusted by changing the area of a gap between a valve plug 50 and a valve seat 51. Excitation pulses are fed to a coil of the stepping motor 6B from the engine control unit 14 via an excitation electrode 53. A rotor 54 is rotated by the feeding of the excitation pulses, and a valve shaft 55 is moved longitudinally. The area of the gap between a valve plug 50 and a valve seat 51 is changed by the motion of the valve shaft 55, and the intake air flow rate is adjusted.

Figure 3:
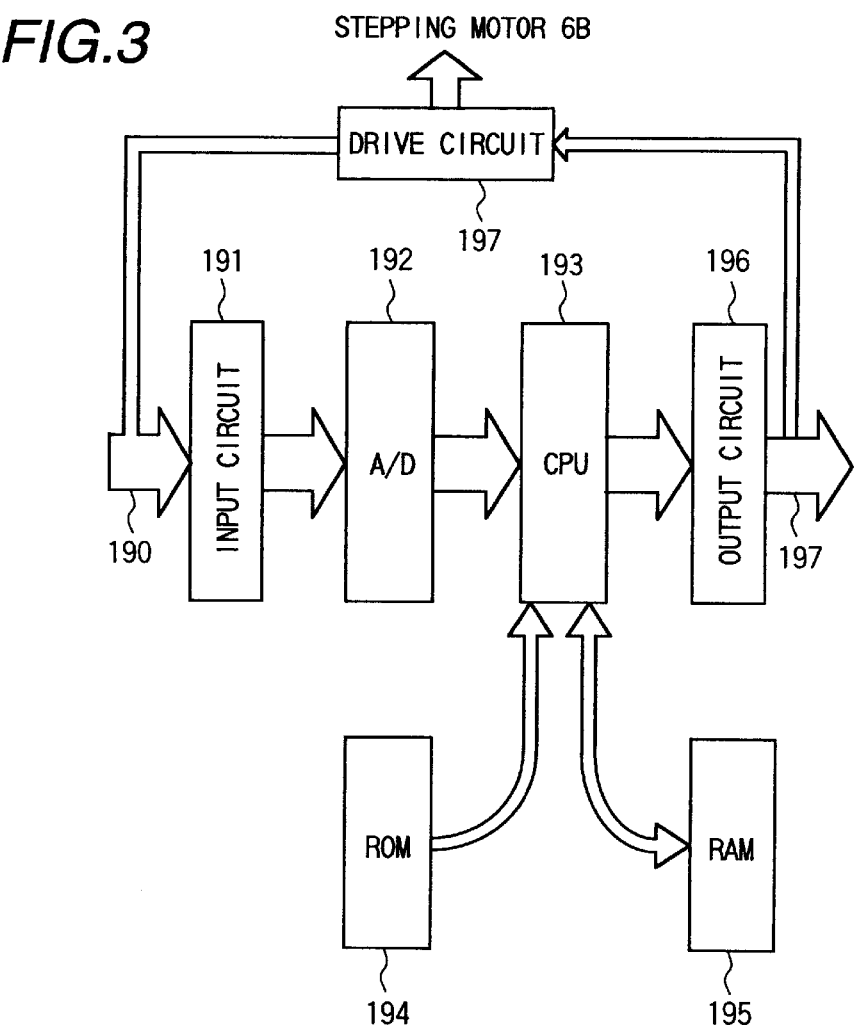
FIG. 3 is a schematic block diagram showing the composition of an engine control unit shown in FIG. 1.

FIG. 3 is a schematic block diagram showing the composition of the engine control unit (ECU) 14 shown in FIG. 1. The ECU 14 includes an input circuit 191, an A/D converter 192, a central processing unit (CPU) 193, a ROM 194, a RAM 195, and an output circuit 196. The input circuit 191 receives input signals such as signals sent from the cooling water temperature sensor 12, the air intake tube pressure sensor 3, the throttle opening degree sensor 5, the oxygen concentration sensor (air to fuel ratio sensor), and so on, and outputs the input signals to the A/D converter 192 with removing noise components from the input signals. Further, the A/D converter 192 converts the analog input signals to digital signals, and outputs the converted signals to the central processing unit 193.

The central processing unit 193 receives the output signals of the A/D converter 192, and performs the required control functions and diagnoses by executing programs for the control functions and diagnoses, which are stored in the ROM 194. The results calculated by the central processing unit 193 and the output signals of the A/D converter 192 are temporarily stored in the RAM 195, and the calculated results are further output as control signals 197, such as a control signal for the fuel injector 8, a drive signal for the stepping motor 6B to drive the stepping motor-driven idling-speed control valve 6, and so on.

Figure 4:
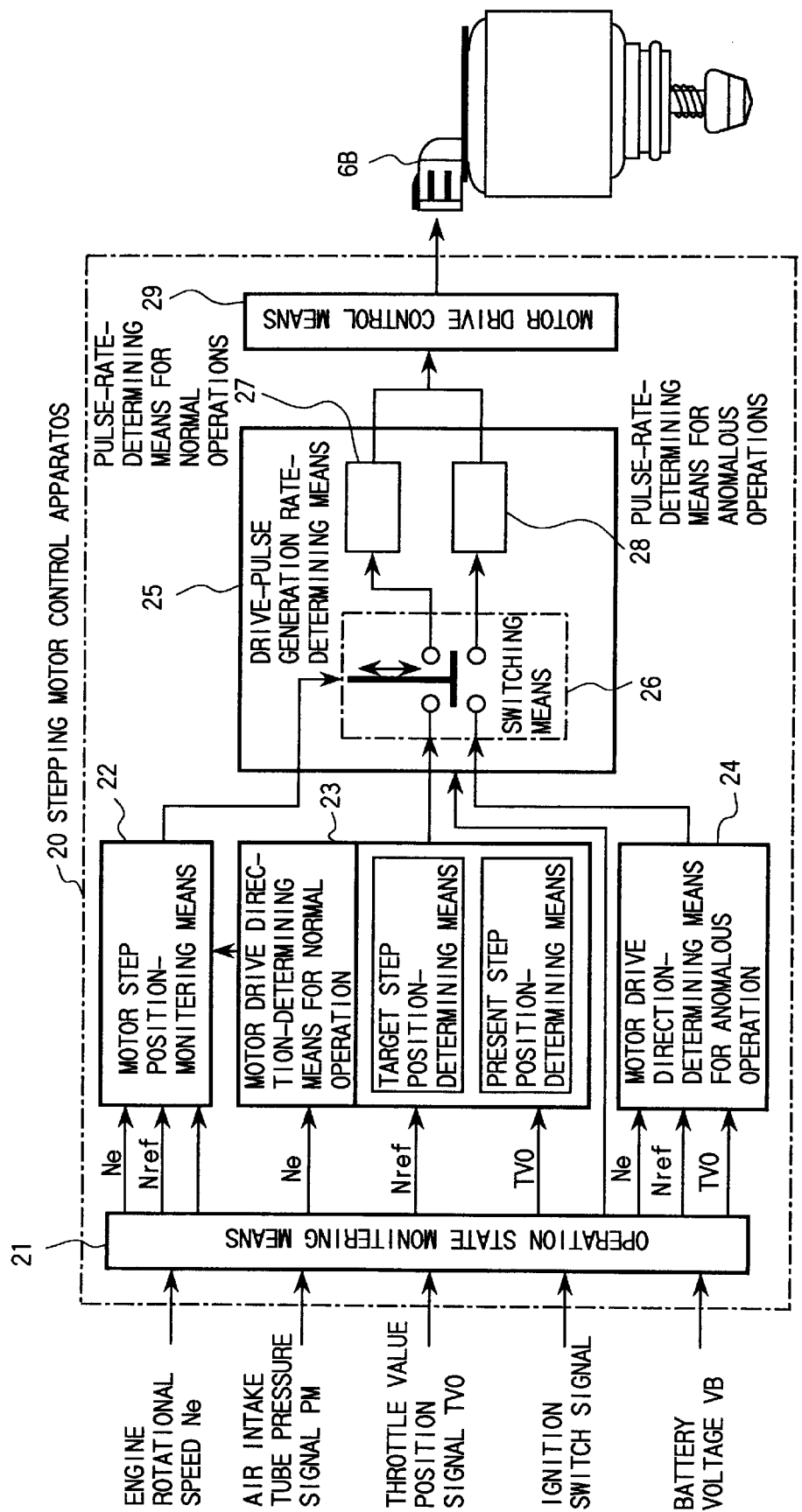
FIG. 4 is a block diagram showing the composition of the stepping motor control unit included in the engine control unit shown in FIG. 1.

FIG. 4 is a block diagram showing the composition of the stepping motor control apparatus 20 included in the engine control unit 14. The control apparatus 20 for the stepping motor 6B includes an engine operation state-monitoring means 21; a motor drive direction-determining means 23 for normal operation, which determines the drive direction of the stepping motor 6B in a normal operation state based on the target step position and the present step position. A motor drive direction-determining means 24 is provided for anomalous operation, which determines the drive direction of the stepping motor 6B in an anomalous operation state. Motor step position-monitoring means 22 determines whether or not the step position of the stepping motor 6B is normal. A drive-pulse generation rate-determining means 25, determines the drive-pulse rate sent to the stepping motor 6B; and a motor drive control means 29 for driving the stepping motor 6B at the pulse-rate determined by the drive-pulse generation rate-determining means 25.

The operation state-monitoring means 21 takes in the input signals sent from the above sensors, such as an engine rotational speed signal Ne, a water temperature signal TW, an air intake tube pressure signal PM, a throttle valve opening degree signal TVO, an ignition switch signal, a battery voltage signal, etc., and outputs the monitoring results to the above means 22, 23, 24, and 25.

The motor drive direction-determining means 23 for normal operation controls the flow rate of intake air with a rotational speed feedback control method based on the target rotational speed and the detected rotational speed of the engine 1 in an idling state. Moreover, the drive direction of the stepping motor 6B is determined based on the target step position and the present step position which are in a region between the maximum and minimum step position. However, when the stepping motor 6B is controlled by the motor drive direction-determining means 23, the stored present step position coincides with the target step position if the engine 1 is in a high-idle state defined as a state in which the actual rotational speed of the engine 1 is higher than the target rotational speed (the converse state is called a low-idle state), and if the present step position is at the preset minimum, the control signal is not sent out.

That is, the stopping of the control signal means that it cannot be determined where the actual step position is; in other words, whether or not sticking or step-loss due to the sticking has occurred in the motor 6B.

On the other hand, the motor drive direction-determining means 24 for anomalous operation determines method of controlling the stepping motor 6B during the anomalous operation, and the drive direction of the motor 6B is determined based on the target rotational speed Nref and the present rotational speed of the engine 1. Further, the motor drive direction-determining means 24 for anomalous operation sends a control signal to the stepping motor drive control means 29 so as to drive the stepping motor 6B in the valve opening or closing direction when the present step position coincides with the target step position, even if the present step position is at the maximum or minimum limit position.

The step position-monitoring means 22 determines whether or not operations of the stepping motor 6B are normal based on the information output from the operation state-monitoring means 21, the target rotational speed Nref, the target step position determined by the motor drive direction-determining means 23 for normal operation, the present step position, of the stepping motor 6B, and so on, and outputs the result of the determination to the drive pulse generation rate-determining means 25. Here, in this embodiment, although the motor step position-monitoring means 22 is provided separate from the operation state-monitoring means 21, it is naturally possible to integrate the motor step position-monitoring means 22 and the operation state-monitoring means 21.

The drive-pulse generation rate-determining means 25 determines the pulse-rate for the motor 6B based on the result determined by the step position-monitoring means 22 and the information output from the operation state-monitoring means 21, also using the switching means 26 between the motor control for normal and anomalous operations, the pulse-rate-determining means 27 for normal operation, and the pulse-rate-determining means 28 for anomalous operation.

The switching means 26 selects an output signal from the motor drive direction means 23 for normal operation or the motor drive direction-determining means 24 for anomalous operation, and makes one of the pulse-rate-determining means 27 and 28 for respective (normal and anomalous operations, respectively) determine the pulse rate for driving the stepping motor 6B. Further, the pulse-rate (motor drive frequency) determined by the drive pulse generation rate-determining means 25 is converted to a motor drive signal by the motor drive control means 29, and the stepping motor 6B is then driven by the converted drive signal.

Figure 5:
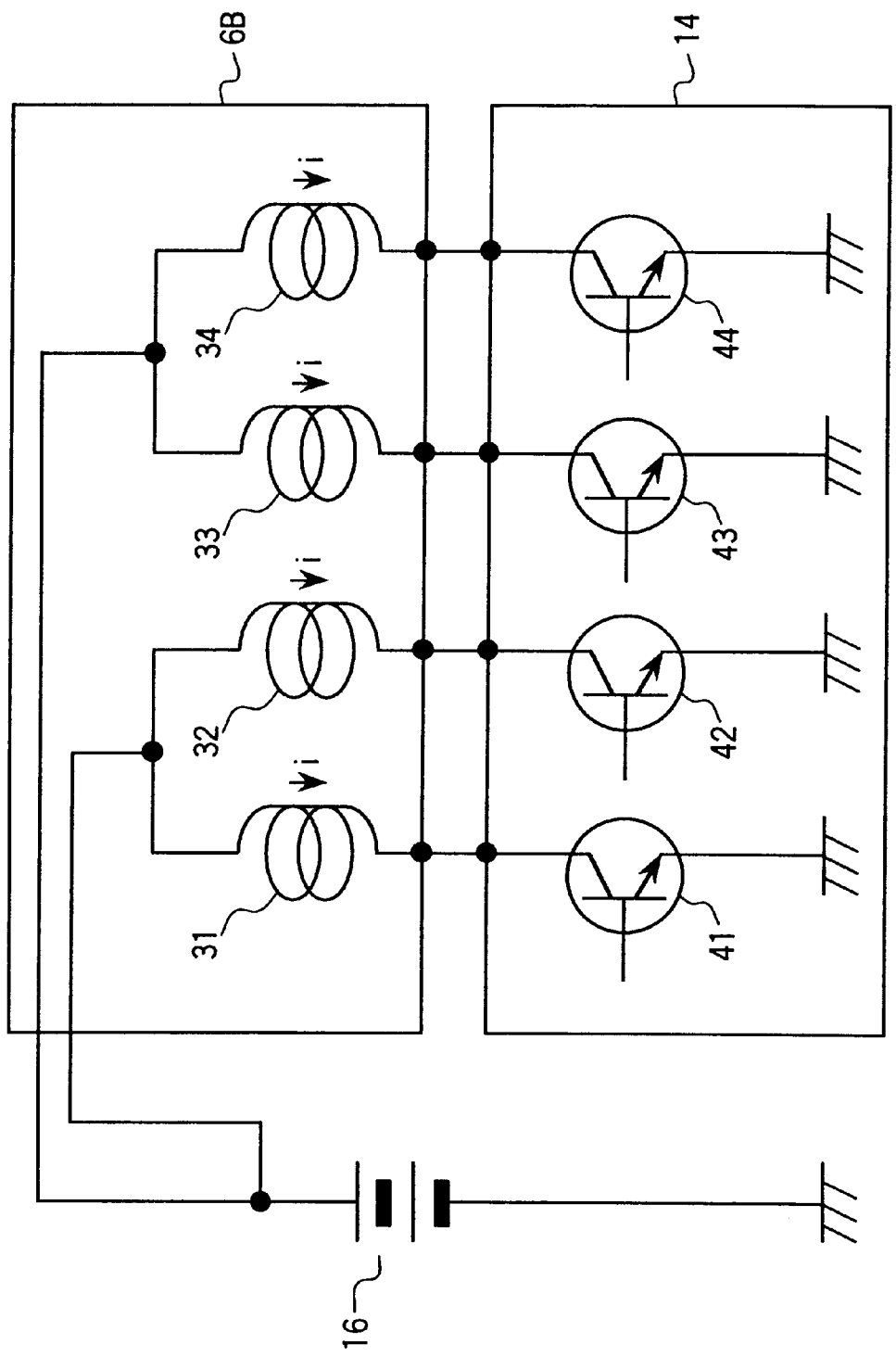
FIG. 5 shows a drive circuit for the stepping motor shown in FIG. 2.

FIG. 5 shows a drive circuit for the stepping motor shown in FIG. 2. This drive circuit is a four-phase unipolar drive circuit in which the unidirectional current i flows in each of the four coils 31–34 integrated in the stepping motor 6B. Transistors Tr 41–44 are also integrated in the stepping motor 6B, corresponding to each of the four coils 31–34. When each transistor is turned on, current flows in the corresponding coil, and the coil is excited. Coils to which current is fed and the time interval for doing so are determined by the drive direction-determining means 23 or 24 and the drive-pulse generation rate-determining means 25. The currents are fed to the respective coils 31–34 with a coil-exciting current pattern such as that shown in FIG. 6. In this figure, the phases A, $\overline{A}$, B, and $\overline{B}$ correspond the coils 31, 32, 33, and 34 shown in FIG. 5. The stepping motor 6B is connected to the stepping motor control unit in the ECU 14 via a harness. A bipolar drive circuit can also be used here in place of the unipolar drive circuit.

Figures 6, 7:
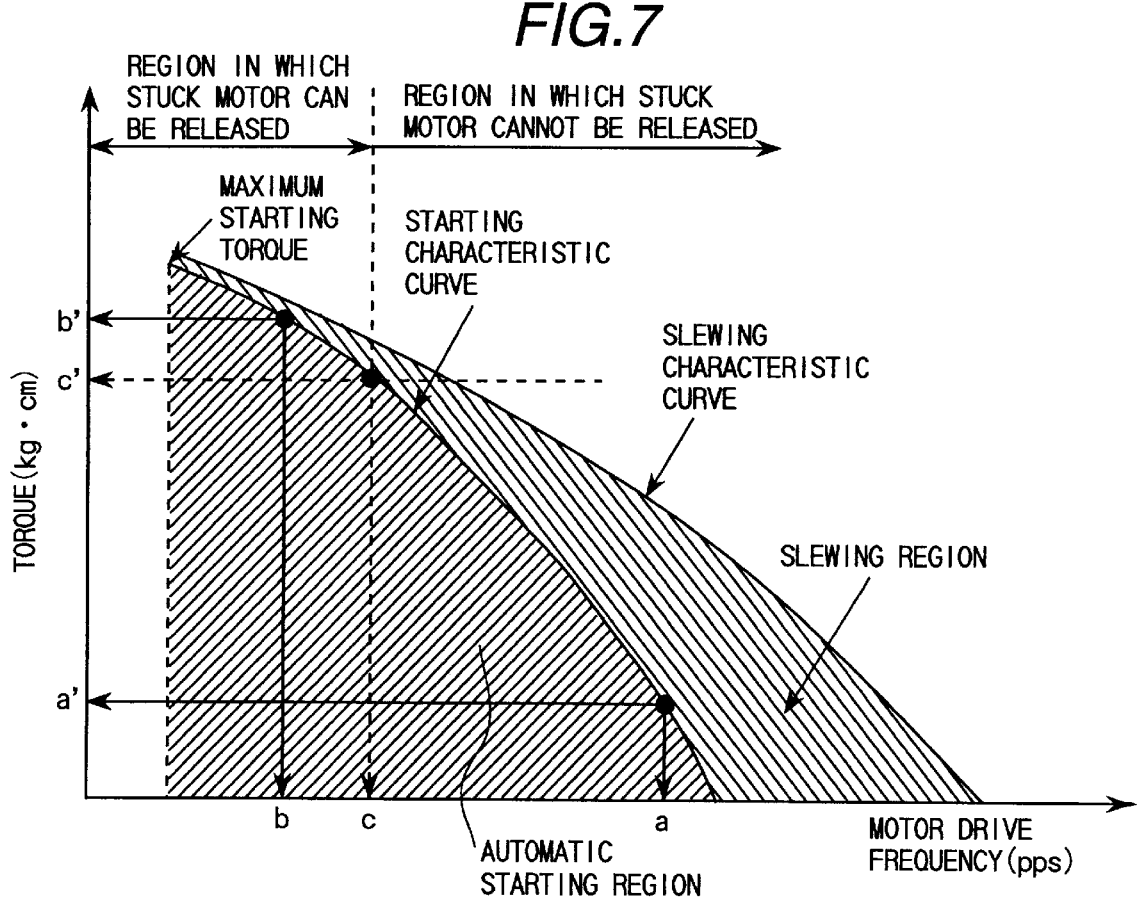
FIG. 6 shows the relationship between the valve opening/closing direction and the coil-exciting current flow patterns.
FIG. 7 shows the relationship between the torque and the pulse-rate of the stepping motor shown in FIG. 2.

FIG. 7 shows the relationship between the torque and pulse-rate (drive frequency) of the stepping motor 6B. To drive the stepping motor 6B, the stepping motor 6B should be in the region inside the starting characteristic curve (the automatic starting region), and be operated in the region inside the slewing characteristic curve (the slewing region). If the pulse-rate for normal operation of the stepping motor 6B is assumed as the frequency a pps (pulses/s), the drive torque of the stepping motor 6B is the torque a' kgf-cm, referring to the starting characteristic curve, and this point is within the starting and the slewing regions. Accordingly, if a pulse-rate of less than the a pps is set to the stepping motor 6B, the motor 6B can be controlled without causing a loss-step state.

On the other hand, letting the torque necessary to release the sticking of the rotor of the stepping motor 6B or the valve shaft be represented by the torque c', the drive frequency of the stepping motor 6B needs to be set at less than c to control the motor 6B without causing a lost-step state. Accordingly, if the sticking occurs, it is necessary to detect the sticking early and set the drive frequency b lower than the frequency c in order to give the motor 6B the torque b'; which is greater than the torque c'.

However, since it is actually difficult to know the necessary torque-c', an effective countermeasure is to drive the stepping motor 6B at the lowest possible frequency. That is, if sticking in the stepping motor 6B is detected, it is advisable that the drive frequency of the motor 6B be set at a frequency lower than that used in normal operations; further, at as low a frequency as possible.

Figure 8:
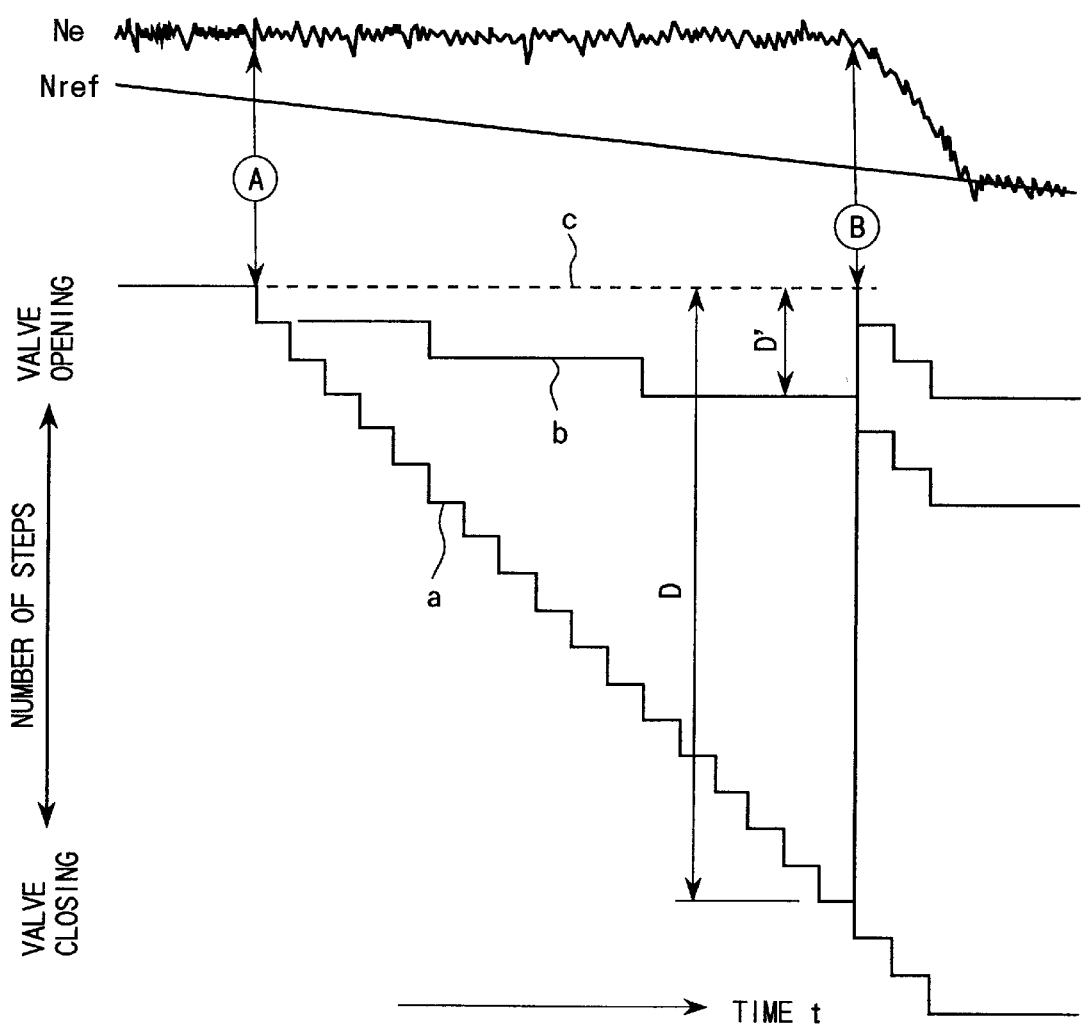
FIG. 8 shows a timing chart for the stepping motor shown in FIG. 2.

FIG. 8 shows a timing chart for controlling the stepping motor 6B when a lost-step state occurs, which is executed by the stepping motor control apparatus of the embodiment.

In this figure, the engine rotational speed Ne has exceeded the target idling rotational speed (Nref) (high-idle state), which is caused by the sticking of the stepping motor 6B, and a lost-step state of the motor 6B due to the sticking is detected at the point A. Further, the point B is the point at which the sticking of the motor 6B is released.

If the sticking is not detected, since normal operations are continued, the step position is driven in the valve-closing direction by the drive frequency a. Despite the drive frequency a demanded by the engine control unit (ECU) 14, the actual step position does not change, and stays at the position-c. That is, the stepping motor 6B has lost steps, which causes the step number difference D between the points A and B.

On the other hand, in accordance with this embodiment, if the sticking is detected at the point A in FIG. 8, and the drive frequency is changed from the drive frequency for normal operation to that for anomalous operation as explained for FIG. 7, the step position is driven with the amount of the step number difference D' in the valve-closing direction between the points A and B by the lower drive frequency b. Therefore, the step number difference is decreased by (D–D') relative to the actual step position, and the effects of the steps lost by the motor 6B can be reduced.

Thus, by driving the stepping motor 6B with the lower drive frequency b, the degradation of the control ability, which is due to the steps lost by the motor 6B, can be prevented to a limited degree.

Moreover, if a learning function is provided in the stepping motor control apparatus 20, and the learning function is executed between the points A and B, although the actual step position stays at the position-c (the actual step position is not changed), the step position is spuriously changed, and the learning operation is performed for the step number difference D. That is, an erroneous learning operation is carried out. Therefore, if the control signal output from the drive direction-determining means 24 for anomalous operation is selected, the execution of the learning function must be prevented.

Furthermore, even though the stepping motor 6B is driven by the control signal output from the drive direction-determining means 24, and the step number difference relative to the position c is decreased from D to D', the actual step position cannot be determined. Therefore, after it is determined that the stuck part has been released, the actual step position is relocated near the position c by correcting the target step position (for example, the predetermined step position corresponding to the reference engine rotational speed Nref). Thus, after the point B, normal control of the motor 6B becomes possible. Here, since the actual step position does not completely coincide with the corrected target position, and the learning operation may have already been carried out, it is necessary to clear the learned values.

Figure 9:
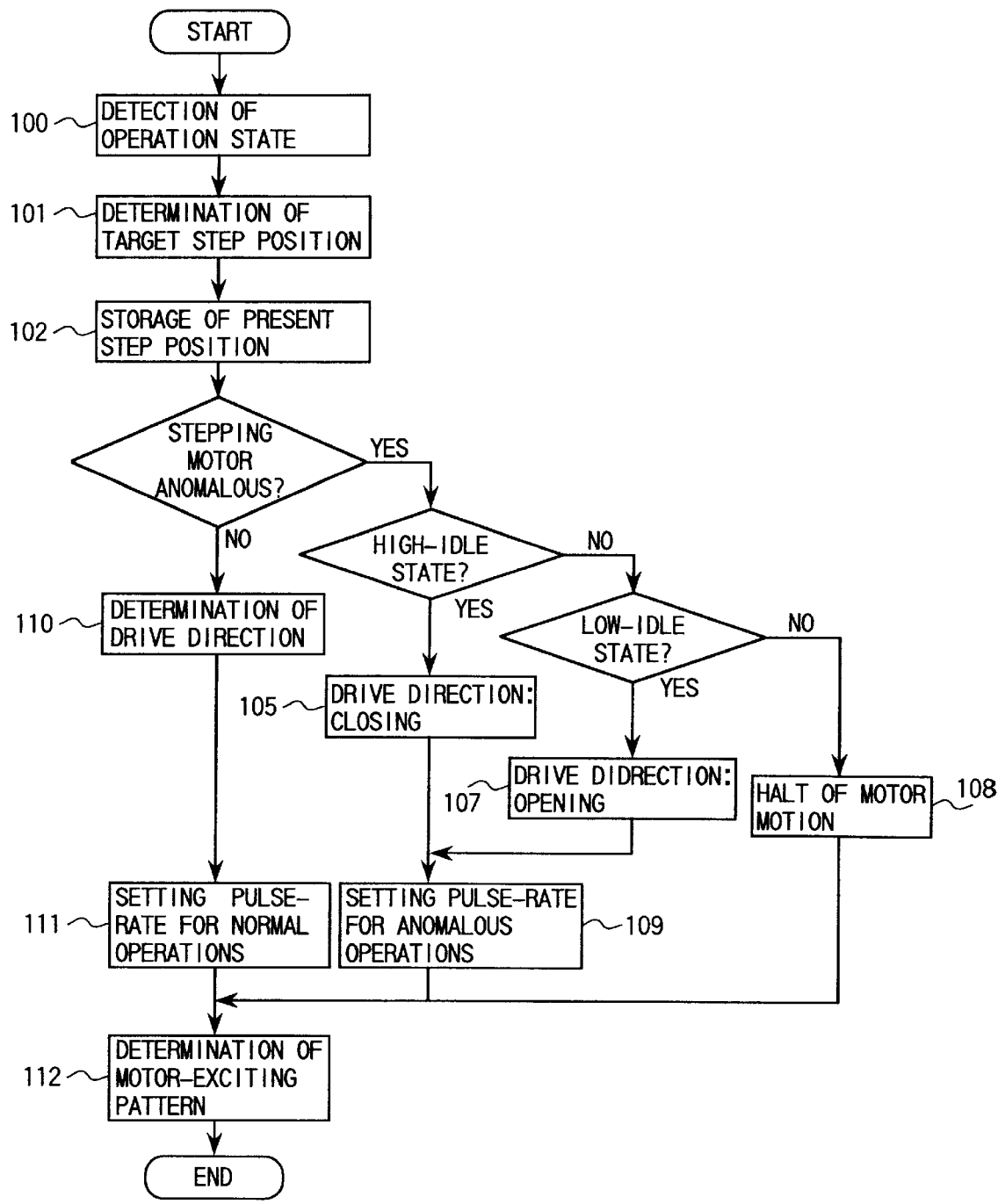
FIG. 9 shows a flow chart for control of the stepping motor shown in FIG. 2.

FIG. 9 shows a flow chart for control of the stepping motor in this embodiment. In step 100, the operation state of the engine 1 is determined based on the operation information detected by the various sensors provided in the engine 1, and the process goes to step 101. In step 101, based on the detected operational information, the target rotational speed is calculated, and this rotational speed is set to the stepping motor 6B as the target rotational speed corresponding to the operation state. Further, the present step position of the motor 6B is stored in step 102.

In step 103, it is determined whether or not operations of the stepping motor 6B are normal, based on the target rotational speed Nref, the target step position and the present step position of the motor 6B as determined by the drive direction-determining means 23 for normal operation, and so on, and if it is determined that operations of the motor 6B are anomalous, the process goes to step 104, otherwise, to step 110.

In step 104, since it is assumed that the engine rotational speed does not coincide with the target rotational speed because of the anomalous operations in the motor 6B, it is determined whether or not the engine rotation is in a high-idle state. If it is determined that the engine rotation is in the high-idle state, the stepping motor 6B is moved in the valve-closing direction in step 105.

Conversely, if it is determined that the engine rotation is not in a high-idle state, it is further determined in step 106 whether or not the engine rotation is in a low-idle state. If it is determined that the engine rotation is in a low-idle state, the stepping motor 6B is moved in the valve-opening direction in step 107. Otherwise, since it is assumed that the engine rotational speed is near the target rotational speed, the operation of the stepping motor 6B is stopped in step 108.

In the high or low-idle state, the pulse-rate is determined in step 109. On the other hand, in the normal idling state, the drive direction is determined in step 110 based on the target and present step positions, and the pulse-rate is determined in step 111.

Furthermore, in step 112, the coil-exciting current pattern is determined based on the determined drive direction and pulse-rate. That is, a two-phase excitation, a half-step excitation, or a non-excitation is selected, and which transistors are to be turned on is further determined. Thus, the stepping motor 6B is driven with the determined coil-exciting current pattern.

Although the present invention is explained with the above described embodiments, the present invention is not restricted to those embodiments, and the present invention can be implemented by variously modifying the embodiments within the scope of claims described later.

As mentioned above, in accordance with the stepping motor control apparatus of the present invention, even if an anomaly such as the sticking of the stepping motor occurs, the anomaly can be detected early, and the degradation of the control ability caused by the steps lost by the stepping motor due to the anomaly, can be prevented to a limited degree, which can prevent a high-idle state or an accident of the engine stopping.

What is claimed is:

1. A stepping motor control apparatus for controlling a stepping motor to drive a fluid flow control valve in an engine, said stepping motor control apparatus comprising:

monitoring means for monitoring an operation state of said engine; and drive means for determining a driving method of said stepping motor and driving said stepping motor based on output signals from said monitoring means;

wherein if an anomalous operation of said stepping motor is detected by said monitoring means, said drive means switches a torque-control mode of said stepping motor from a normal-state control mode to an anomalous-state control mode.

2. A stepping motor control apparatus according to claim 1, wherein said drive means controls said stepping motor so as to increase torque of said stepping motor.

3. A stepping motor control apparatus for controlling a stepping motor to drive a fluid flow control valve in an engine, said stepping motor control apparatus comprising:

engine operation state-monitoring means for monitoring an operation state of said engine;

step position monitoring means for monitoring a step position of said stepping motor;

first motor drive direction-determining means for determining a motor drive direction during normal operations of said stepping motor, based on a target step position and the present step position of said stepping motor;

second motor drive direction-determining means for determining a motor drive direction during anomalous operations of said stepping motor;

drive-pulse rate-determining means for determining a pulse generation rate for driving said stepping motor; and motor drive control means for driving said stepping motor at said pulse generation rate determined by said drive-pulse rate-determining means.

4. A stepping motor control apparatus according to claim 3, wherein said step position monitoring means determines that the present step position is anomalous if the present step position is equal to the target step position, and the difference between the present rotational speed and the target rotational speed of said engine exceeds a predetermined reference value.

5. A stepping motor control apparatus according to claim 4, wherein, if it is determined that said present step position is anomalous, said drive-pulse generation rate-determining means sends said motor drive control means a demand signal to drive said stepping motor at a predetermined pulse-rate until said difference is decreased to a level lower than a predetermined reference value.

6. A stepping motor control apparatus according to claim 5, wherein said predetermined pulse-rate has a pulse-rate frequency such that it will increase output torque of said stepping motor.

7. A stepping motor control apparatus according to claim 5, wherein said predetermined pulse-rate has a pulse-rate frequency less than that at which said stepping motor has been driven in normal operations of said motor.

8. A stepping motor control apparatus according to claim 5, wherein said one of said drive direction-determining means for normal and anomalous operations sends said motor drive control means a command signal to drive said stepping motor to open said fluid flow control valve if the present rotational speed is lower than the target rotational speed of said engine.

9. A stepping motor control apparatus according to claim 3, wherein said one of said drive direction-determining means for normal and anomalous operations sends said motor drive control means a command signal to drive said stepping motor to close said fluid flow control valve if the present rotational speed is higher than the target rotational speed of said engine.

10. A stepping motor control apparatus according to claim 3, further including learning means for learning a correct step position, in which said execution of said learning means is stopped while a demand signal to drive said stepping motor is output from said second motor drive direction-determining means.

11. A stepping motor control apparatus according to claim 10, wherein if the present step position and the target step position are changed and renewed to step positions predetermined for anomalous operations, said learning means performs one of clearing a step position which had been learned and changing said learned step position to said renewed step position.

* * * * *